Feb. 21, 1967     T. G. STALEY     3,304,646

TRAP FOR BUGS AND THE LIKE

Filed Nov. 9, 1964

*INVENTOR.*
Thomas G. Staley
BY
*Wenderoth, Lind & Ponack*
ATTORNEYS

United States Patent Office 3,304,646
Patented Feb. 21, 1967

3,304,646
TRAP FOR BUGS AND THE LIKE
Thomas G. Staley, Eagle Point, Oreg. 97524
Filed Nov. 9, 1964, Ser. No. 409,779
2 Claims. (Cl. 43—131)

This invention relates to a trap for bugs such as beetles, spiders, cockroaches, earwigs, flies, ants, bees, termites, and depending upon the size, the traps are also suitable for mice, rats and other small animals.

An object of the invention is to provide a trap which provides holes or cracks and the like thereby taking advantage of the natural tendency of insects and mice to crawl in or enter holes.

A further object of the invention is to locate inside the holes sticky glue-like fly paper or birdlime which may be poisoned and perhaps a food so as to attract the insects by its smell.

A still further object of the invention is to make a trap which is so inexpensive that it may be freely used and then picked up and disposed of in the garbage or the incinerator.

A further object of the invention is to make the holes constituting the trap from corrugated paper or the like which may be plastic or any other material and which can provide holes which may be of various shapes and sizes and may be single or multiple.

A still further object of the invention is to construct the trap of opaque, transparent or colored material.

With the above and other objects in view which will become apparent from the detailed description below, various preferred modifications of the traps are shown in the drawings in which.

Figure 1:
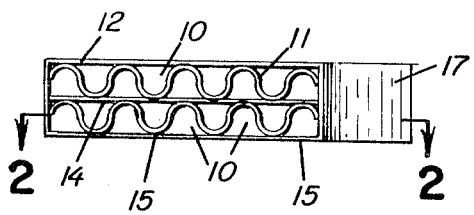
FIGURE 1 illustrates a side view of one form of the invention.
Figure 2:
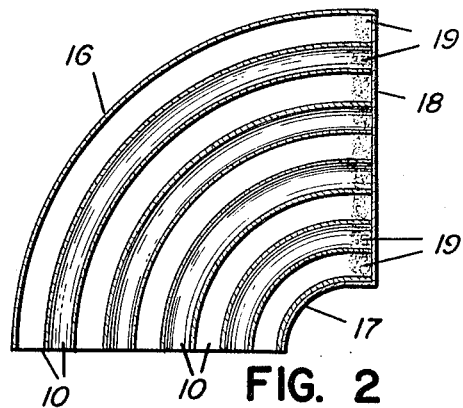
FIGURE 2 is a cross-sectional view taken upon section line 2—2 of FIGURE 1.

In FIGURES 1 and 2, one form of the invention is shown wherein the holes or chambers 10 are formed by placing a corrugated sheet 11 between a top surface 12 and a partition 14. At the lower side of the partition 14 a further corrugated sheet 15 is positioned between the partition 14 and the bottom 15. In the form shown, the trap is curved having an outer side periphery 16 and an inner periphery 17. With regard to this form, one end may be closed by a closure 18 thereby allowing the chambers 10 to be open at only one end. Instead of curving the trap as shown it may extend rectilinearly and it may also extend undulating as desired.

With regard to the material used in forming the different elements of the trap a cheap construction is preferably used of paper, plastic, any suitable composition, metal, etc. Located within the chambers 10 at any desired position a sticky substance may be placed which may be located in stripes, dots, and a continuous or non-continuous cross-hatched pattern. A suitable poison may be incorporated therewith and preferably a substance having an attractive odor for the particular insects desired to be trapped is incorporated therein. In FIGURE 2 the sticky substance together with the poison is indicated at 19 at the end of the passageway or channel.

The channels 10 may be cylindrical, triangular, waveform, corrugated or polygonal in cross-section.

The above materials and poisonous substances are incorporated in all the various forms of the invention.

Figure 3:
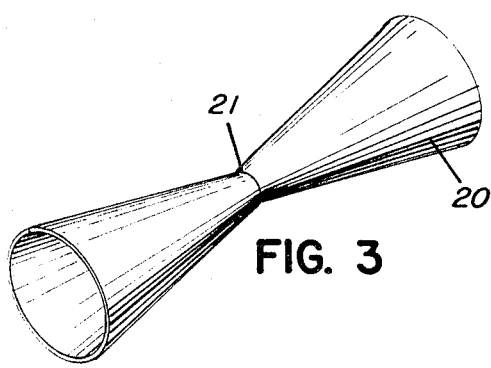
FIGURE 3 is a perspective view of a further modification and illustrates a constricted tube trap having tapered ends.

In FIGURE 3 the trap is shown as a singular tubular construction 20 having a constriction 21 therein.

Figure 4:
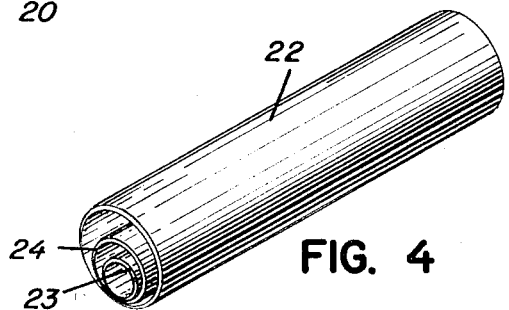
FIGURE 4 is a perspective view of another modification illustrating a multi-assembly of apertures.

The form shown in FIGURE 4 comprises an outer tubular casing 22 provided with the smaller cylindrical casings inserted therein shown at 23 and 24. All of the cylindrical tubes may be provided with the sticky adhesive substance and poison as above described with reference to FIGURES 1 and 2.

Figure 5:
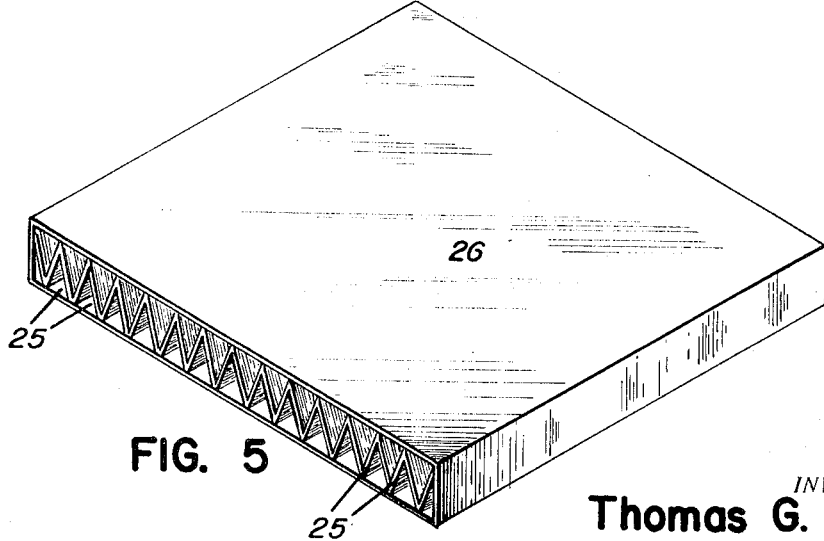
FIGURE 5 is a perspective view of a further modification wherein the cross-secitonal shape of the holes are triangular.

In FIGURE 5 a further modification is shown wherein the channels 25 are triangularly shaped and in this form only a single layer of such channels is disclosed within the container 26.

In all of the forms shown the material is a cheap construction of paper, plastic, composition, metal, etc. so that the traps are inexpensive and after a short time may be thrown away in the garbage or incinerator and fresh traps distributed in the areas to be served.

The size of the trap will depend upon the type of insect or rodent to be captured. The inside surface away from the end or entrance to the chambers 10, 25 and the like are coated with a sticky glue like fly paper or birdlime which is preferably poisoned and also is provided with a food smell to attract the particular insects desired. As is known, bugs and mice have a natural tendency to crawl into or enter holes and cracks and also to crawl under objects. With the trap shown the insect will get stuck and can not escape.

It is also obvious that the shape of the chambers and the outside configuration of the traps may assume various forms. For instance the forms shown in FIGURES 1 and 5 may be curved or even have U-turns or can have a zig-zag formation. The chambers or holes may have any desired cross-sectional form.

In view of the inexpensiveness of the construction these traps may be scattered around in homes, buildings or in fields so as to protect the crops. They may even be scattered extensively in orchards and forests so as to trap only the desired insects without scattering poison throughout the entire area whereby harm will come to animals and insects which it is not desired to trap.

I claim:
1. A trap for insects, rodents and the like comprising a sector-shaped casing having side, top and bottom walls curving through an arc of substantially 90°, a corrugated insert secured within said casing and conforming to the curvature of said casing walls to provide a plurality of longitudinally curved channels, said channels being closed at one end by a wall of said casing, and a poison located in said channels at said one end thereof.

2. A trap for insects as set forth in claim 1 wherein said casing and insert are formed from paper.

References Cited by the Examiner
UNITED STATES PATENTS

| | | | |
|---|---|---|---|
| 1,259,911 | 3/1918 | Seibert | 43—131 |
| 1,394,497 | 10/1921 | Heller | 43—131 |
| 2,340,255 | 1/1944 | Weil | 43—131 |

SAMUEL KOREN, *Primary Examiner.*
WARREN H. CAMP, *Assistant Examiner.*